No. 855,693. PATENTED JUNE 4, 1907.
J. C. COLE.
APPARATUS FOR VULCANIZING TIRES.
APPLICATION FILED NOV. 13, 1906.

Witnesses:
H. L. Sprague.
H. W. Bowen.

Inventor:
John C. Cole.
by Chapin & Co.
Attorneys.

UNITED STATES PATENT OFFICE.

JOHN CLARENCE COLE, OF CHICOPEE FALLS, MASSACHUSETTS, ASSIGNOR TO THE FISK RUBBER COMPANY, OF CHICOPEE FALLS, MASSACHUSETTS, A CORPORATION.

APPARATUS FOR VULCANIZING TIRES.

No. 855,693.      Specification of Letters Patent.      Patented June 4, 1907.

Application filed November 13, 1906. Serial No. 343,294.

*To all whom it may concern:*

Be it known that I, JOHN CLARENCE COLE, a citizen of the United States of America, residing at Chicopee Falls, in the county of Hampden and State of Massachusetts, have invented new and useful Improvements in Apparatus for Vulcanizing Tires, of which the following is a specification.

This invention relates to an improved means for vulcanizing the tread of automobile tires so that only the particular portion of the same that is desired can be vulcanized.

The invention consists broadly in subjecting the tire, when inflated, to heat and pressure, the degree of heat and amount of pressure being suitably controlled. The means for carrying out this result consists of a hollow ring into which steam or any suitable heating element can be introduced, and supported on this ring are mold pieces for receiving the tread portion of the tire,—one of the pieces being provided with means for varying the amount of pressure on the mold pieces and the tire.

The particular object of the present invention is for re-treading an inflatable tire that has become worn to such an extent that a new tread-piece is necessary and requires vulcanization onto the body of the old tire and at the same time subjecting only the rubber constituting the new tread portion to heat.

Figure 1:
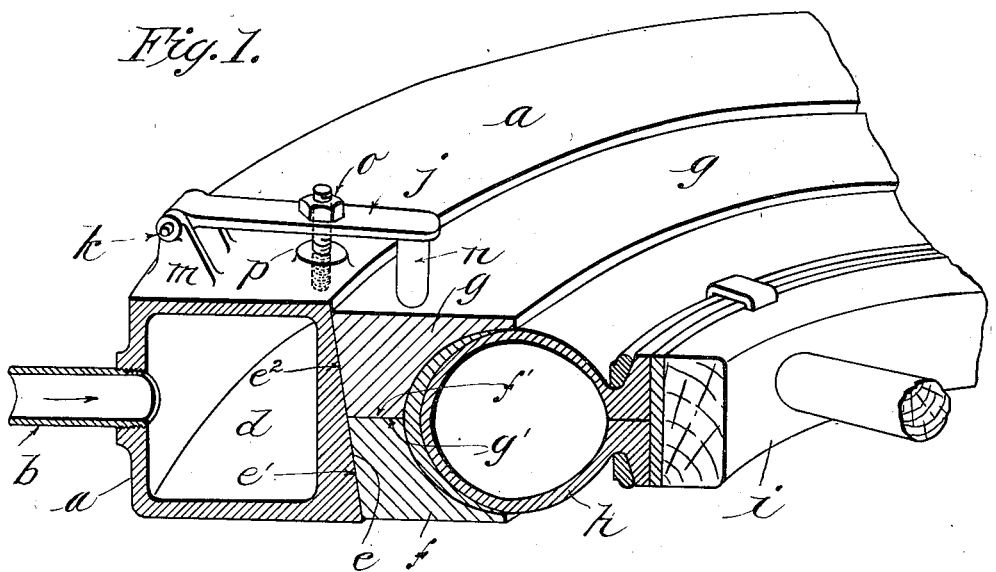
Figure 2:
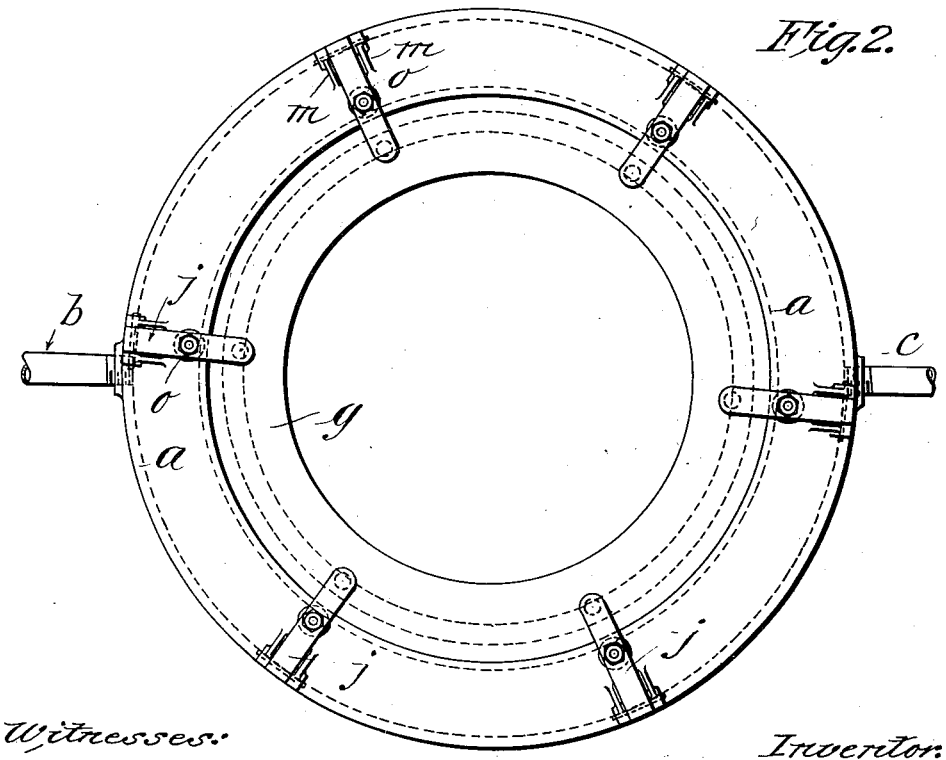

In the drawings forming part of this application,—Figure 1 is a perspective view of a portion of the heating ring and mold pieces supported thereby and showing the manner of supporting the tire and wheel in place for vulcanizing the tread portion of the same. Fig. 2 is a plan view on a reduced scale of the entire structure.

Referring to the drawings in detail, $a$ designates a hollow heating ring made from any suitable metal and provided with inlet and outlet pipes $b$ and $c$ communicating with the interior thereof. These pipes are for the purpose of allowing steam or other heating element to enter the interior portion $d$ of the ring. The inner surface of this ring is inclined, as shown at $e$, for receiving the mold pieces $f$ and $g$ that are provided with surfaces $e^1$ and $e^2$ having the same degree of inclination as the surface $e$ of the ring, for engaging the surface $e$ so that the mold pieces will lie in the plane of the ring.

$h$ designates an inflated pneumatic tire shown assembled on the periphery of a wheel $i$. When it is desired to vulcanize the tread portion of the tire, the elements for accomplishing this result are assembled in the following manner. The lower mold piece $f$ is dropped into place on the inclined surface $e$ of the ring $a$, as shown in Fig. 1. The tire is then placed in contact with the lower mold piece $f$. The second or upper mold piece $g$ is next placed within the ring $a$ and in contact with the tire $h$, the meeting surfaces $f^1$ and $g^1$ being held apart by the tire $h$ before pressure is applied. The clamping arms $j$ which are pivoted at the point $k$ on the lugs $m$ are then thrown over into the position shown. The foot of the posts $n$ rests on the upper surface of the mold-piece $g$ in this position. The nuts $o$ are then screwed down onto the threaded posts $p$, which operation forces the mold-pieces $f$ and $g$ together, as shown, and firmly into contact with the tread portion of the tire. After these series of clamping arms $j$ are adjusted, the heating element, as steam, is allowed to enter the interior of the ring $a$ having first determined the degree of temperature that the same is to be used. This heating element freely circulates around the ring $a$ and escapes by he pipe $c$. The heat of the ring, as readily understood, is conducted to the metal mold pieces $f$ and $g$ which, in turn, heats the tire $h$ and vulcanizes the tread portion of the same. This heat and pressure is continued for a suitable length of time, as determined by experiment, so that the desired results are obtained.

One of the advantages of this system or method of vulcanization is that any desired portion of the tire can be vulcanized without affecting the remaining portion of the tire, as these mold pieces can be made of different degrees of curvature to meet the conditions required.

What I claim, is:—

1. In an improvement of the class described, a ring constructed for receiving a heating element and for supporting mold pieces, said mold pieces being substantially semi-circular in cross sectional contour on their inner surface and adapted to receive the tread portion only of the tire, and means for subjecting the tire to pressure.

2. In an improvement of the class described, a heating ring, means thereon for supporting mold pieces for receiving the tread portion only of a tire, means carried by the heating ring for subjecting the mold pieces to pressure, and means for heating the ring and mold pieces.

3. As an improvement in means for vulcanizing inflatable tires, a hollow ring for receiving a heating element, and for supporting a pair of mold pieces, said mold pieces being shaped to receive the tread portion of the tire, and means on the ring for subjecting the mold pieces and tire to pressure.

4. As an improvement in means for vulcanizing inflatable tires, a hollow ring provided with means for permitting a heating element to enter and escape therefrom, an inclined surface on the inside of said ring, a lower mold piece supported on the inclined surface, an upper mold piece adapted to engage the lower mold piece, said pieces having registering edges for receiving the tread portion of the tire, and means for subjecting the mold pieces for the tire to pressure, as described.

5. An apparatus for vulcanizing the tread portion of an inflatable tire, a ring provided with an inclined surface, a two-part mold supported on the same and each part being provided with a curved registering surface for engaging the tread portion only of the tire.

6. A vulcanizing apparatus having in combination a ring for containing a heating medium, a two-part mold having substantially a semi-circular surface, the mold being supported by the ring and in intimate contact therewith whereby the mold is heated from the ring and whereby when the tire is placed within the mold the tread portion only will be vulcanized.

7. A vulcanizing apparatus having in combination an annular heating element, a mold for receiving an inflated tire and divided in substantially the plane of the wheel, and means for clamping the parts of the mold together, the annular heating element having an inclined surface, the mold also having an inclined surface for engaging the inclined surface of the heating element.

8. A vulcanizing apparatus for inflatable tires, a ring, means for heating the same, a two-part mold carried by the ring and divided substantially in the plane of the wheel, said mold embracing only the tread portion of the inflatable tire, as described.

9. A vulcanizing apparatus for tires having in combination with a heating element a two-part mold for engaging the tread portion only of a tire, and means to support the mold in contact with the heating element, said means comprising an inclined surface for the two-part mold, as described.

JOHN CLARENCE COLE.

Witnesses:
K. I. CLEMONS,
H. W. BOWEN.